United States Patent

Geronime

[15] 3,697,726
[45] Oct. 10, 1972

[54] HEATED ROLL TEMPERATURE MEASUREMENT COMPENSATOR ASSEMBLY

[72] Inventor: Robert L. Geronime, Rosemount, Minn.

[73] Assignee: Rosemount Inc., Eden Prairie, Minn.

[22] Filed: Sept. 17, 1971

[21] Appl. No.: 181,435

[52] U.S. Cl. ............................ 219/469, 219/216
[51] Int. Cl. ................................. H05b 1/02
[58] Field of Search............ 219/469, 471, 216, 501

[56] References Cited

UNITED STATES PATENTS

| | | | |
|---|---|---|---|
| 3,456,095 | 7/1969 | Fox | 219/501 |
| 3,487,187 | 12/1969 | Martens et al. | 219/469 X |
| 3,588,445 | 6/1971 | Hopkins | 219/501 |
| 3,612,830 | 10/1971 | Dienes | 219/471 |

*Primary Examiner*—Bernard A. Gilheany
*Assistant Examiner*—F. E. Bell
*Attorney*—Ralph L. Dugger et al.

[57] ABSTRACT

A temperature measurement and control device for rotating heated rolls, such as those used in the fiber processing industry. The temperature sensor is stationarily mounted and positioned in a slot at one end of a rotating roll, and the sensor is used for controlling power to a heater utilized with the roll. The sensor thus is used to control the temperature of the roll surface. At high roll speeds the thermal coupling between the sensor and the roll is adequate, but at lower speeds that are encountered during the slowing down and stopping of the rolls, the thermal coupling between the roll surfaces and the sensor reduces in efficiency and the sensor conducts a large proportion of heat to its mounting structure. The present device utilizes passing a current through the sensor to self-heat the sensor to compensate for this decrease in thermal coupling and resultant stem conduction error.

8 Claims, 6 Drawing Figures

INVENTOR.
ROBERT L. GERONIME

3,697,726

HEATED ROLL TEMPERATURE MEASUREMENT COMPENSATOR ASSEMBLY

BACKGROUND OF THE INVENTION

1. Field of the Invention

The present invention relates to devices used for controlling sensing the temperature in heated rolls.

2. Prior Art

Heated processing rolls such as those shown in U.S. Pat. No. 3,273,101 are widely used in industry in the manufacture of synthetic fibers. Further, the heating power to the rolls is usually controlled by a temperature sensor associated with the roll to measure the temperature on the roll surface. In U.S. Pat. No. 3,273,101 a stationary thermometer positioned in an annular slot on a rotating roll, so that the roll rotates past the stationary thermometer during operation, has been found to be satisfactory at high speeds. However, marginal accuracy occurs when the speed of the roll is reduced, and the heat transfer to the temperature sensor is therefore correspondingly reduced. The temperature sensor conducts a good bit of heat from the measuring end of the sensor down to its stem at the place where it is mounted on the stationary structure. This error is termed stem conduction error and becomes quite significant when the roll is not rotating at all, as for example during shut down of a processing machine to start a new run of fibers.

SUMMARY OF THE INVENTION

The present invention relates to means for compensating for thermal conduction error in measuring temperatures of a rotating roll wherein the temperature sensor projects into an annular slot of a roll which rotates past the sensor. The stationary sensor, which is of the resistance wire type, is supplied with a current to self-heat the sensor to compensate for the loss of heat transferred to the temperature sensor when the roll is stopped, or operating slowly. The controls include a comparator controller to compare a temperature set point signal with the actual temperature measured by the sensor. The sensor measuring circuit can for example be bridge circuitry, and a current is passed through the resistance wire sensor, so that the sensor will self-heat to the desired degree. The sensor current is adjusted so it will be hotter than ambient conditions with the roll rotating slowly or when stationary, and when the roll is rotating rapidly, the current through the sensor has very little effect on the temperature signal.

The device is relatively simple to adjust to the proper levels, and accurately compensates for losses by conduction to the mounting structure for the sensor.

DESCRIPTION OF THE PREFERRED EMBODIMENT

Figure 1:
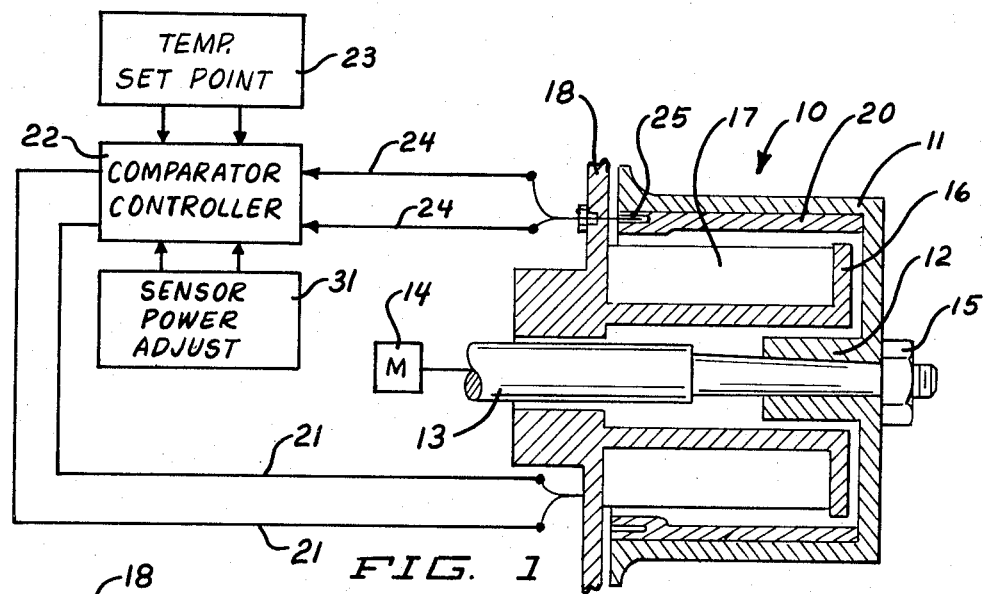
FIG. 1 is a sectional view of a typical roll heater utilizing a compensator circuit made according to the present invention shown schematically.
Figure 2:
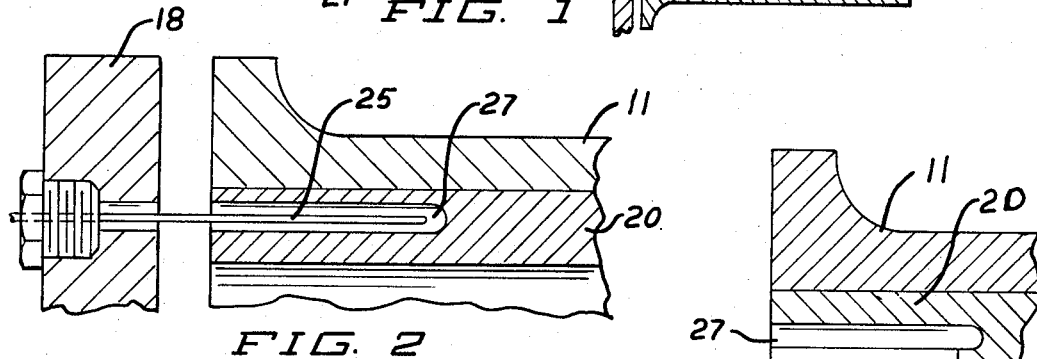
FIG. 2 is a fragmentary enlarged sectional view of the mounting slot and temperature sensor of the device of FIG. 1.

Referring to FIG. 1, a heated roll assembly illustrated generally at 10, is of the usual type used in the fiber processing industry. These rolls are typically 2 to 8 inches in length and 3 to 8 inches in diameter, and rotate at speeds as great as 8,000 rpm. The fiber diameter being processed may vary from very light filaments on the order of 20 microns in diameter to strands that may be as large as 0.040 inch. Typically these strands are wrapped around the roll one to 10 times as they are being processed. The roll rotates as the filaments pass to and from the roll. The roll surface temperatures that are employed are normally on the order of 200°–500° F and it is necessary to control the surface temperatures to within a few degrees of the desired setting in order to get necessary uniformity of the fiber being processed. Each roll is normally in a machine that has on the order of 40–140 rolls on it, and the machines are shut down repeatedly in order to start new runs by threading a new fiber on the rolls.

The roll illustrated generally at 10 comprises a cup shaped shell 11, that has an interior hub 12 mounted onto a rotating spindle 13 driven by a motor shown schematically at 14. The hub 12 is drivably mounted onto the spindle 13, and the nut 15 can be used for fastening it in place. The cup shaped roll has a hollow interior, into which a stationary coil support 16 is mounted. The coil support surrounds the spindle 13, and has an inductive coil 17 wrapped therearound. The coil support is in turn mounted onto a stationary wall 18.

The heater coil 17 forms one part of the heating structure. The heating element comprises an inner sheath 20, mounted on the inside of the shell 11 and extending annularly around, which forms a shorted transformer turn for the heating element, thus setting up secondary currents in the conductive sheath which provide heating. Suitable leads 21 are supplied to the coil 17 from comparator control circuitry 22. The comparator controller circuitry 22 compares a signal indicating a temperature set point from suitable set point source 23 with signals received along leads 24 from a resistance type temperature sensor 25. The power on leads 21 is adjusted so that the set point temperature signal and the sensed temperature signal along leads 24 from the sensor 25 are equal.

As shown the sensor 25 is mounted to the wall 18 with a suitable fitting. The sensor 25 projects through an opening in the wall 18, and into an annular slot 27 defined in the conductive sheath 20. The annular slot is open ended, and extends all the way around the roll, so that as the roll rotates it will move past the end portion of the sensor 25, and heat in the sheath will heat the sensor.

The wall 18 for example is much lower in temperature than the rotating roll, which is heated, and this gives rise to a heat transfer to the mounting structure of the sensor. This heat transfer is particularly objectionable when the roll is rotating slowly because the heat transferred to the sensor is much less than when the roll is rotating rapidly. This is called a stem conduction error, and has given rise to errors as much as 10° to 30° C when the roll is stationary. However, in the present device, a self heating current passes through the resistance wire forming sensor 25 to self-heat the sensor to a predetermined level to compensate for this stem conduction error.

Figure 6:
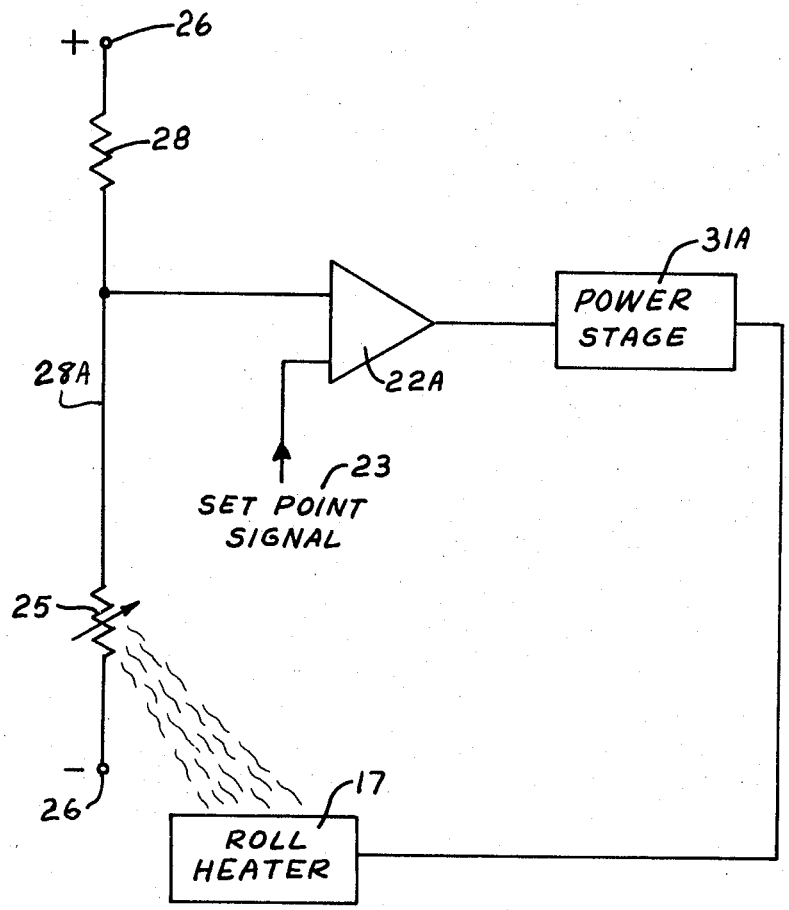
FIG. 6 is a further schematic representation of the heater control circuitry of the present invention.

As shown in FIG. 6, a stable voltage source is applied across terminals 26 which causes a current flow through a resistor 28 and the sensor 25. The current through the sensor can be changed by varying the value of resistor 28 which would comprise the sensor power adjust. The voltage signal on the line 28A between sensor 25 and resistor 28 varies as a function of the value of the resistance of sensor 25. The sensor preferably is a resistance wire sensor such as a platinum wire, or a thermistor which changes resistance as a function of temperature. This voltage signal on the line 28A between resistor 28 and sensor 25 forms one input to an amplifier 22A. The other input to the amplifier is a voltage signal which comprises the set point signal from the set point circuitry. Any differential in signals between the two inputs to amplifier 22A results in a proportional output signal from the amplifier, which when fed through a power stage 31A, drives the heater 17 that in turn heats the sensor to change the resistance of the sensor until a balance of the input signals is achieved.

When the heat transfer between the roll and the sensor drops in efficiency the sensor signal will indicate a lower temperature than the actual roll temperature because of reduced thermal coupling. However, when the thermal coupling is low in the present device the sensor is self-heated for compensation.

The amount of current required is relatively small, but is sufficient to heat the sensor to a higher than ambient temperature when the roll is rotating slowly or is stationary, and will offset the normal stem conduction error encountered. At high rotating speeds of the roll this effect of the self-heating current is negligible, and the sensor responds accurately to the roll surface temperature because the heat transferred to the sensor is so much greater than the heat loss through stem conduction. As the roll is reduced in rotating speed, the heat transferred to the sensor is diminished because the thermal coupling to the roll surface is reduced.

Figure 3:
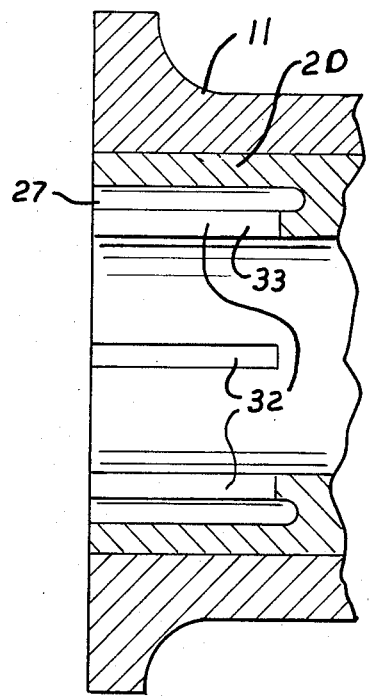
FIG. 3 is a sectional view showing temperature compensation slots for cutting the inductive heating in the sensor area to further compensate for temperature measurement variations.

Referring to FIG. 3, a plurality of slots 32 can be cut into the sheath to reduce the currents in the sheath 20 adjacent the annular slot.

The slots 32 extend only through the wall portions 33 from the inner surface of the annular slot 27 to the inner surface of the sheath. These slots 32 prevent induced currents from traveling around the sheath, and eliminate some of the problem that has resulted from unusually high temperatures resulting in the wall portion 33. Due to the annular slot 27 wall portion 33 is not in as close thermal contact with the outer shell 11 as other portions of the sheath. In other words the slot 27 acts as a heat barrier to conduction of heat from the wall section 33 outwardly. The slots 32 do cut down the induced currents in this position of the sheath, and equalize the temperature in the wall portion 33 to help eliminate additional errors. The number of slots can typically be from one to six, as desired for getting the proper temperature gradient.

Figure 4:
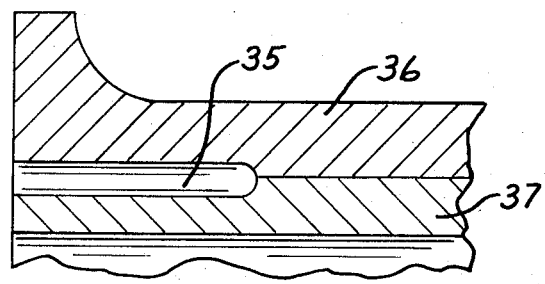
FIG. 4 is a sectional view of a portion of a roll showing a slot for a temperature sensor of different configuration.

FIG. 4 shows differently configured annular slot 35 cut partially into an outer shell 36 of a rotating roll and partially into the inner sheath 37. The temperature sensor projects into the annular slot 35, and the slot is closer to the outer roll surface.

Figure 5:
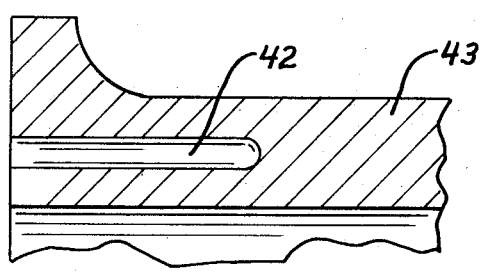
FIG. 5 is a further modified portion of a roll in sections showing a slot in the roll housing.

FIG. 5 shows an annular slot 42 cut directly into an outer shell 43 of a rotating roll, and wherein the conductive sheath is not utilized on the interior of the shell. The technique of applying self-heating power to the temperature sensor that is utilized in the different slot can be used with any slot configuration.

What is claimed is:

1. In a heated roll assembly comprising a rotating cup shaped roll, heating means for heating said roll, power means for powering said heating means, and a stationary temperature sensor mounted to sense the temperature of said roll as said roll rotates and to control power to said heating means in response to the temperature sensed, the improvement comprising a self-heating circuit means connected to said temperature sensor to effectively raise the temperature of said sensor above ambient conditions when said roll is rotating below a preselected speed.

2. The combination as specified in claim 1 wherein said sensor is a resistance sensor, and said self-heating means comprises means to pass an electrical current through said sensor.

3. The combination as specified in claim 2 wherein said sensor comprises a probe type sensor, an annular opening defined in an end of said roll, said probe type sensor projecting into said opening.

4. The combination as specified in claim 2 wherein said heating means comprise electrical heating means and said sensor controls electrical power to said heating means, and means to compare the signal from said sensor with a set point signal, and means to adjust the power to the heating means in response to a difference in the sensor and set point signals.

5. The combination as specified in claim 4 wherein said heating means comprises a stationary induction coil mounted inside said cup shaped roll, and a conductive sheath on the interior of said roll adjacent said coil.

6. The combination as specified in claim 5 and at least one axial slot defined in said sheath and intercepting said annular slot to interrupt current flow around said sheath adjacent said annular slot.

7. A method of compensating for stem conduction error in a stationarily mounted resistance temperature sensor utilized in combination with a moving member that moves at different speeds in a cycle of operation comprising the steps of providing heating means for said moving member, controlling said heating means in output level in response to a signal from said sensor, positioning said sensor adjacent said moving member in position to be affected by heat of said member in a close correlation when said member is operating at higher speeds, and passing a current through said sensor to self-heat said sensor and keep said sensor at a temperature above ambient conditions when said member is moving below a predetermined speed.

8. The method of claim 7 further including the step of comparing a signal from said sensor with a set point signal and adjusting the power to the heating means in relation to differances between the sensor signal and the set point signal.

* * * * *